Sept. 11, 1928.
W. E. HOLLAND
1,684,277
BATTERY REENFORCING HANDLE
Filed Dec. 1, 1921
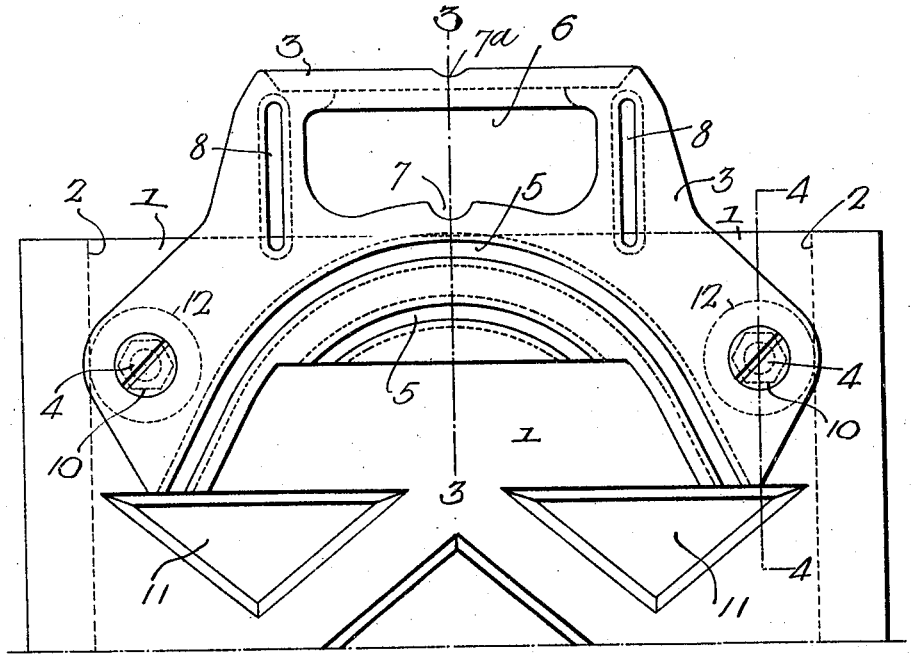
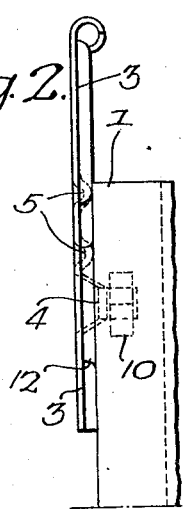
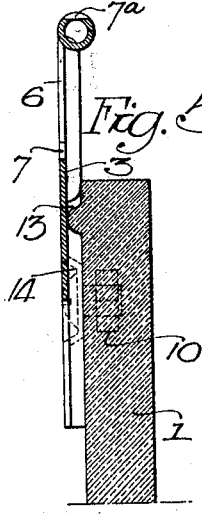
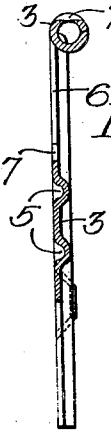
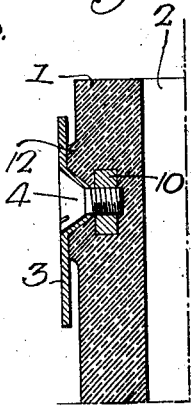
Inventor—
Walter E. Holland.
by his Attorneys—
Howson & Howson Patented Sept. 11, 1928.

1,684,277

UNITED STATES PATENT OFFICE.

WALTER E. HOLLAND, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

BATTERY-REENFORCING HANDLE.

Application filed December 1, 1921. Serial No. 519,169.

One object of my invention is to provide a handle particularly designed for use in connection with containers such as battery boxes, which in addition to providing means whereby such a container may be moved or transported, shall serve to reenforce or stiffen the walls of said container, the construction of the handle being such that it shall serve to hold the container in shape, especially preventing bulging of its walls in case they should become softened by heat or otherwise weakened from any cause.

Another object of the invention is to provide a handle, particularly designed for use in connection with a hard rubber container which, while being relatively strong and stiff, shall be of such construction as to contact with relatively limited areas of the container or other object with which it is used; and the invention contemplates a handle having corrugations which shall engage with the surface of the container, the whole being so arranged that any liquid getting between the container and the handle shall be free to run out.

Another object of the invention is to provide a handle which, while possessing the above characteristics, shall be inexpensive to make, convenient to mount and of such a design as to be capable of connection to the end of a battery container by means of widely separated fastenings, adjacent the side walls, such that any strain on the handle, as from the hold-down clamps in an automobile, is transmitted to relatively stiff portions of the container walls and bulging or other deformation of said walls is prevented.

These objects and other advantageous ends I attain as hereinafter set forth, reference being had to the accompanying drawings, in which, Fig. 1 is an elevation of part of one end of a container, showing my handle as applied thereto;

Fig. 2 is a side elevation of the handle and a portion of the container shown in Fig. 1;

Figs. 3 and 4 are vertical sections taken on the lines 3—3 and 4—4, Fig. 1; and

Fig. 5 is a side elevation showing an alternative construction.

In the above drawings, 1 represents a portion of the end wall and 2 a part of the side wall of a hard rubber container particularly adapted for the reception of the elements of a storage or other electric battery. To the outside surface of each of the end walls of said container is applied a handle 3, preferably made of a body of stamped or pressed-up sheet metal, formed with conical depressions around bolt holes at its opposite sides for the reception of bolts 4 designed to be threaded into nuts 10 permanently set or molded within the end wall 1 of the container.

The lateral breadth of the handle is such that these bolts with their nuts are located in the end wall adjacent its integral junctions with the side walls of the container, so that the stresses set up between the handle and the container are assumed by portions of the end wall which are stiffened and reinforced by said adjacent side walls.

The flat metal body of the handle is formed with one or more corrugations or projecting ribs 5, in the present instance two, each of which follows preferably a curved line which is upwardly bowed. That is, the highest part of the line of corrugation is at or adjacent a vertical line extending through the center of the handle, from which said line curves outwardly and downwardly. Said corrugations or ribs are preferably curved in section so that when the handle is clamped against the flat outside surface of the container, with the ribs projecting inward, each of said ribs engages, or is in a position to engage, said surface substantially tangentially, making a line contact therewith.

Centrally above the corrugations the material of the handle is extended upwardly and is provided with a hand hole 6, the upper edge of said material, as well as a portion thereof cut out of said opening, being bent or formed into substantially cylindrical shape to provide a rounded surface for lifting purposes. In the top of the handle as well as at the middle of the bottom edge of the hand hole 6, I form notches or depressions 7, 7ª, for the reception of a hold-down hook or clamp. At either side of the hand hole I form vertically-extending corrugations 8, preferably projecting toward the container, to form stiffening or strengthening ribs.

The container walls may be paneled as shown at 11, Fig. 1, or molded with any other desired surface design. Without departing from my invention the corrugations 5 may be omitted from the handle and molded on the container wall instead, as shown at 13, Fig. 5. Likewise, the bosses 12 may be omitted from the container and other means of spacing the main body of the handle away from the container wall may be provided. For example, the portions of the handle around the bolt holes may be projected to meet the main surface of the container wall, as shown at 14, Fig. 5. In any case, the design should be such that only a limited proportion of the handle surface is in contact with the container, and that liquid may drain freely from between the handle and the container.

With the above described arrangement of parts, if for any reason liquid from the container or other source should fall between the handle and the outside surface of the wall 1, the spacing of the main body of the handle away from the container surface together with the downwardly-extending ribs or corrugations would facilitate its immediate discharge, and owing to the line contact of said handle and said container, a minimum quantity, if any, of the liquid will be held by capillary action. In addition, the corrugations 5 strengthen and stiffen the handle so that comparatively thin metal may be used at a considerable saving in cost. Further savings in cost result from the construction which permits the use of but two bolts where at least three have been required heretofore, as well as from the design shown which provides for a minimum waste in blanking out handles from sheet metal, inasmuch as the metal cut from between the lower projecting portions of one handle is utilized to form the upper portion of the next handle.

If owing to the heating of the electrolyte in the container, the walls thereof become more or less softened, or if it is desired to use a non-rigid material in the construction of the container, the tendency of its end walls to bulge is effectually counteracted by the handles, since, by reason of their inflexible construction and extended reinforcing engagement with said walls they hold it in shape at the points where it would otherwise tend to become deformed.

By reason of the fastening points being adjacent the junctions of the side walls with the wall on which the handle is mounted, strains on the handle are transmitted to relatively stiff portions of the container so that bulging or other deformation of the container walls from such causes is effectually prevented. Moreover it is to be noted that the parts of the handle below a straight line between the bolt holes constitute stabilizing means for the handle, stiffening and materially adding to its rigidity when it is mounted on a container or other object.

I claim:

1. A handle for battery containers consisting of a substantially flat body of sheet material formed with a projecting rib having its ends directed downwardly; said rib being adapted to engage with the surface of the container with which the handle is used.

2. A handle for battery containers consisting of a body of sheet metal having two transversely spaced bolt holes; with a stabilizing portion extending below each of said bolt holes; an upwardly extending central portion forming the handle proper; and a corrugation extending upwardly from the bottom of each of said stabilizing portions and inwardly substantially to the base of said central portion.

3. A handle for battery containers consisting of a laterally elongated body of metal having downwardly-extending end portions and formed with at least one corrugation projecting from its inner face and extending downwardly from the center into said end portions.

4. The combination, with a battery container, of a sheet-metal handle having projecting ribs; with means for holding said handle to the container with the ribs engaging the same, said ribs being positioned to facilitate discharge of liquid from between the container and the handle.

5. The combination, with a battery container having a generally flat surface, of a sheet-metal handle having at least one corrugation on a line extending downwardly from the center toward each end of the handle and making contact with said container surface; and means for holding said handle to the container.

6. In combination, a substantially rectangular container having two nuts set in a side wall thereof adjacent its junction with other side walls; a handle having two bolt holes and including stabilizing portions extending below said bolt holes; with two bolts for attaching said handle to said container.

WALTER E. HOLLAND.